US009183230B2

(12) United States Patent
Chitiveli (10) Patent No.: US 9,183,230 B2
(45) Date of Patent: Nov. 10, 2015

(54) CONTENT ANALYTICS SYSTEM CONFIGURED TO SUPPORT MULTIPLE TENANTS

(75) Inventor: Srinivas Chitiveli, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/348,528

(22) Filed: Jan. 11, 2012

(65) Prior Publication Data

US 2013/0179450 A1  Jul. 11, 2013

(51) Int. Cl.
*G06F 17/30* (2006.01)
*G06F 21/62* (2013.01)

(52) U.S. Cl.
CPC ...... *G06F 17/30283* (2013.01); *G06F 21/6218* (2013.01)

(58) Field of Classification Search
CPC ............ G06F 21/6218; G06F 21/6227; G06F 21/6236; G06F 21/6245; G06F 21/6254; G06F 17/30598; G06F 17/30705; G06F 17/30241; G06F 17/3053
USPC .................................................. 707/783, 737
See application file for complete search history.

(56) References Cited

U.S. PATENT DOCUMENTS

| 7,680,825 | B2 | 3/2010 | Becker | |
|---|---|---|---|---|
| 7,748,027 | B2* | 6/2010 | Patrick | 726/2 |
| 7,930,318 | B2 | 4/2011 | Becker | |
| 8,291,490 | B1* | 10/2012 | Ahmed et al. | 726/17 |
| 2003/0078897 | A1* | 4/2003 | Florance et al. | 705/80 |
| 2008/0157933 | A1* | 7/2008 | Winkler | 340/10.6 |
| 2009/0025063 | A1* | 1/2009 | Thomas | 726/4 |
| 2009/0089866 | A1* | 4/2009 | Yato et al. | 726/6 |
| 2010/0138830 | A1* | 6/2010 | Astete et al. | 718/1 |
| 2010/0198730 | A1 | 8/2010 | Ahmed et al. | |
| 2010/0250547 | A1* | 9/2010 | Grefenstette et al. | 707/740 |
| 2010/0250712 | A1 | 9/2010 | Ellison et al. | |
| 2010/0262625 | A1* | 10/2010 | Pittenger | 707/783 |
| 2011/0106808 | A1* | 5/2011 | Hersans et al. | 707/740 |
| 2011/0213789 | A1* | 9/2011 | Doshi et al. | 707/754 |
| 2011/0258620 | A1* | 10/2011 | Gao et al. | 717/178 |
| 2014/0244689 | A1* | 8/2014 | Prabaker et al. | 707/784 |

FOREIGN PATENT DOCUMENTS

WO    2011050482 A1    5/2011

OTHER PUBLICATIONS

Lan-Ju, Kong et al, Research on Index of Multi-Tenant Based on Key-Values for SaaS Application (Abstract and Background only), Dec. 2010, pp. 2239-2247, vol. 33, No. 12, Chinese Journal of Computers.
Xue, Wang et al., Multiple Sparse Tables Based on Pivot Table for Multi-Tenant Data Storage in SaaS, Proceeding of the IEEE International Conference on Information and Automation, Jun. 2011, pp. 634-637, IEEE, Piscataway, New Jersey, United States.

* cited by examiner

*Primary Examiner* — Cam-Y Truong
(74) *Attorney, Agent, or Firm* — Patterson & Sheridan, LLP (57) ABSTRACT

Techniques are disclosed for a software as a service (SaaS) provider to host a content analytics tool used to evaluate data collections for multiple customers (referred to as tenants) using one dedicated and expandable computing infrastructure, without requiring that the service provider obtain, install, license, and manage a separate copy of the content analytics tools for each tenant. Customers are provided access to resources dedicated to their enterprise, but do not have access, or even awareness, of data collections or analytics resources hosted for other customers. That is, embodiments presented herein allow a provider to host content analytics tools used by customers to evaluate their enterprise data in a secure and timely manner.

10 Claims, 7 Drawing Sheets

CONTENT ANALYTICS SYSTEM CONFIGURED TO SUPPORT MULTIPLE TENANTS

BACKGROUND

Embodiments of the invention are generally directed to a content analytics system configured to support multiple tenants. More specifically, embodiments of the invention allow a software as a Service (SaaS) provider to host a content analytics service for multiple customers using a single dedicated and expandable server network.

Enterprises frequently collect data related to customers, partners, products, people, etc., and the size of the resulting data sets continues to grow exponentially over months and years. A variety of tools have been developed to help discover insights present in these collections of structured and unstructured data. Enterprises evaluate stored data in order to derive a variety of insights about their operation. For example, customer feedback data may be evaluated to help identify issues with current lines of businesses, identify processes failing their current missions, as well as identify new business opportunities to pursue. Of course, the evaluation may be tailored to the available data and the goals of the enterprise. For example, a telecom provider would like to analyze the customer calls received at their call centers to identify most frequently reported issues or to identify trends in call topics indicating an emergent issue.

To address these types of analytical needs, an enterprise may build a data center and either develops software applications suited for their line of business or purchases analytical applications from vendors. With recent growth of cloud computing however, enterprises favor SaaS providers, as they don't have to spend budget on maintenance or hardware or related licenses. Instead, an enterprise pay the SaaS provider based on usage. The charge models could be charge per MB of indexed data or the number of detected insights.

SUMMARY

Embodiments provide techniques for providing a multi-tenant content analytics system. For example, one embodiment provides a computer-implemented method for providing secure multitenant access to a hosted content analytics application. This method may generally include receiving, from a plurality of tenants, a respective dataset, wherein each tenant is assigned an application ID by the content analytics application; and generating, by operation of one or more computer processors, a data collection from each received dataset. Each data collection includes one of the datasets and corresponding data analytics information generated by the content analytics application. This method may also include assigning a collection ID to each data collection, associating each collection ID with the application ID assigned to the tenant from whom the respective dataset was received, and providing each tenant with user access to the generated data collection corresponding to the assigned application ID and associated collection ID.

Additional embodiments include a computer-readable storage medium storing an application, which, when executed on a processor, performs the above recited method as well as a system having a processor and a memory storing an content analytics tool configured to respond to evaluate data collections for multiple tenants by performing aspects of the method recited above.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for a software as a service (SaaS) provider to host a content analytics tool used to evaluate data collections for multiple customers (referred to as tenants) using one dedicated and expandable computing infrastructure, without requiring that the service provider obtain, install, license, and manage a separate copy of the content analytics tools for each tenant. Customers are provided access to resources dedicated to their enterprise, but do not have access, or even awareness, of data collections or analytics resources hosted for other customers. That is, embodiments presented herein allow a provider to host content analytics tools used by customers to evaluate their enterprise data in a secure and timely manner.

Typically, SaaS providers have reserved dedicated hardware and installed content analytics tools per enterprise to ensure only authorized users have access to enterprise data hosted by the SaaS provider. This architecture provides customer isolation and security at the server (hardware) level. However, purchasing dedicated servers per customer becomes expensive and eventually limits the cost effectiveness of this approach. Similarly, licensing distinct copies of the content analytics software per customer may become prohibitively expensive. Further, using dedicated servers (even dedicated virtual serves or virtual machine images) requires that administrators maintain the operating systems (OS) and the software installations (including patches and version upgrades) on a per customer deployment basis. Doing so results in more hours per administrator (prone to errors) and customers not receiving bug fixes or new features delivered in product patches at the same time.

In order to ensure cost effectiveness of the cloud deployment and ensure all the customers are treated with the same level of serviceability, embodiments of the invention provide a multi-tenant architecture used to host and provide content analytics services. In one embodiment, the multi-tenant configuration hosts multiple customers on one installation of the content analytics tools (which may span multiple physical and/or virtual server systems). As a result, the SaaS provider requires only a single installation (and license) of the software used to host and service analytical needs for many customers with similar needs For example, assume companies A, B and C have outsourced their analytical requirements to a service provider hosting the content analytics service in a cloud. This vendor may manage a dedicated and expandable hardware platform to host data supplied by companies A, B and C (and other customers). The platform is used to provide access to the content analytics services as well as provide a portal where individual companies A, B and C can upload enterprise data in a secure and timely manner. In one embodiment, to provide separation per tenant, the content analytics tool may assign a distinct application ID to each individual customer or enterprise that provides data to be evaluated using the analytics tools hosted by the platform. Once uploaded to the cloud-based platform, the analytics tool may create distinct analyzable indexes per tenant. That is, the analytics tool creates separate data collections and/or analytics indexes (e.g., a consumer sentiment analysis created from feedback messages) using the data received from a given tenant. In one embodiment, each data collection/analytics index may be assigned a distinct identifier (referred to as a collection ID). The application IDs are used to map a tenant to their respective data collections (identified by the collection IDs). That is, each tenant (identified by an application ID) only has access to data and the results of content analytics associated with their application ID.

The platform is configured such that employees of company A can access their dedicated analyzable indexes and are unaware of analyzable indexes hosted for other companies. When the provider updates the platform with an upgraded version of fix pack released for the content analytics tool, all tenants get access to bug fixes and new features at same time. Similarly, when the provider updates an operations system (OS) on the hardware platform (or on a virtual machine image running on the hardware platform), all customers are receive the benefit of bug fixes, security patches or feature upgrades at the same time. Thus, advantageously, hosting a multi tenant architecture, results in the service provider needing less person hours per tenant and lower budget allocations for hardware and software. This ensures cost effectiveness and competitiveness in the market space.

In addition to providing a dedicated application ID for mapping data collections per tenant, embodiments of the invention may further apply role based facet security and navigation to the data collections and analytics information. For example, a doctor may be allowed to view facets related to diseases, drugs, dosages, age, sex, allergies, etc., created by the analytics tool in analyzing customer data, but prevented from accessing facets related to billing like SSN, credit card details, amount owed, etc. Likewise, a user from billing should be able to view facets related to billing but not view the medical facets.

In this context, a "facet" or "facet value" refers to data supplied by an enterprise tenant or analytics information in a data collection generated from the enterprise data that has been tagged with metadata indicating it belongs to a given facet. In one embodiment, in addition to controlling the display of facet values for navigation of data collections and indexes, facet values (if any) discovered in free text, unstructured data, or analytics results may be redacted from reports. For example, free text could be a text version of the billing statement or an electronic copy of a doctor's dictation regarding patient treatment. In such a case, if a doctor is looking at a billing statement to review a list of procedures rendered to a patient, the analytics tools may blur or blackout information like a patient's SSN, or amounts due, address information, number of reminders for unpaid dues, etc. That is, the analytics tool may redact facet values from a data collection that a given user is not authorized to view.

At the same time, when evaluating enterprise data, the content analytics tool may analyze the complete set of data provided by a tenant—regardless of what facet a given data element belongs. That is, although a user may not have direct access to certain elements of a data collection, indexes, analytics information, or access to certain facets and/or facet values, and although some analytics information presented to a user may be redacted in reports generated by the content analytics tool, the analytical processing performed by the content analytics tool still relies on the full set of enterprise data. Doing so enforces the role based access and facet navigation rules, while still allowing for the full value of the analytics processing to be obtained.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the cloud provider may host a content analytics tool configured to analyze enterprise data sets received from multiple tenants. The multi-tenant content analytics tool may be configured to provide secure, separated access to enterprise data received from the tenants, as well as provide role based facet navigation and value redaction for users associated with a given tenant accessing a data collection.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention described below rely on examples of a multi-tenant content analytics tool system used to provide analytics services to multiple clients. It should be understood that the techniques described herein may be adapted for a broad variety of data collections and analytics processing. Thus, examples of a data collection created by a telecommunications provider and examples relating to data collections related to medical services are included to be exemplary only.

Figure 1:
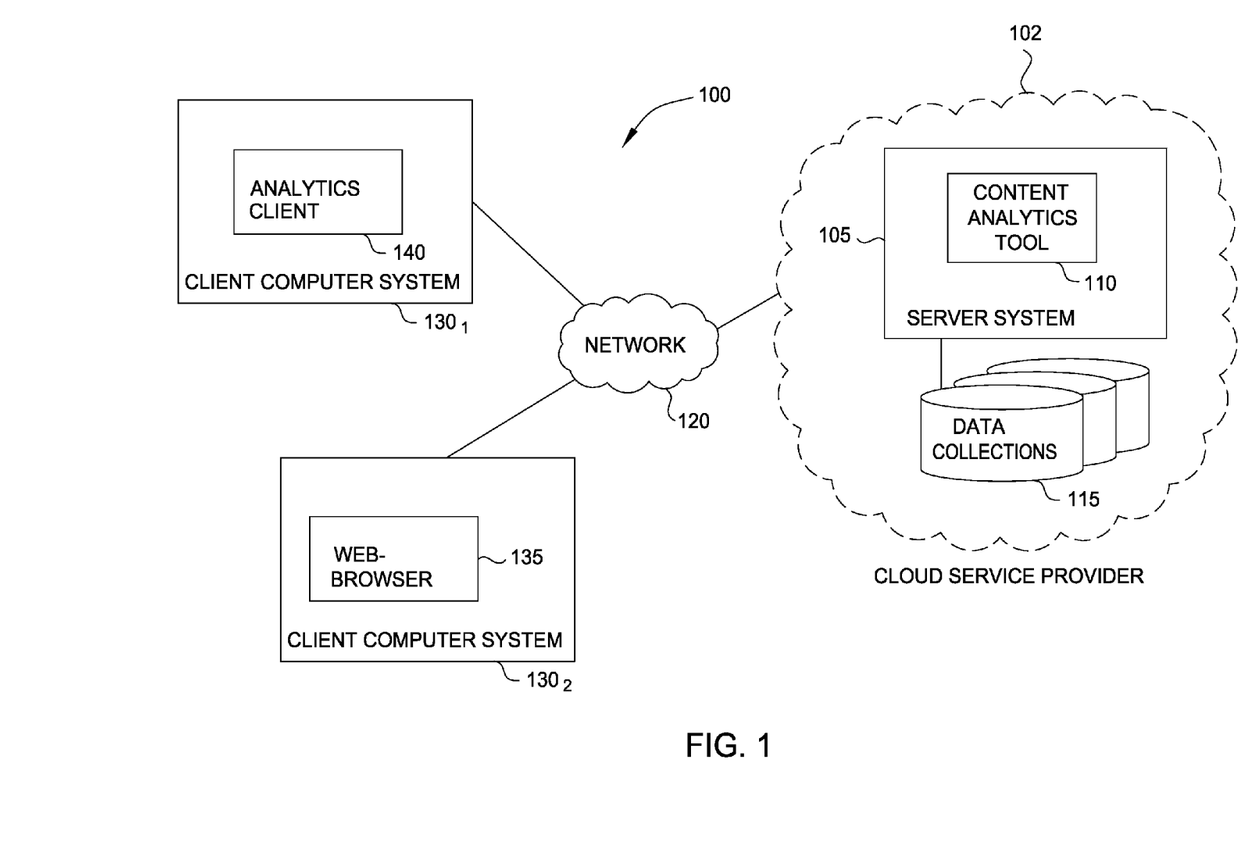
FIG. 1 illustrates an example computing infrastructure used to host a content analytics service for multiple tenants, according to one embodiment of the invention.

FIG. 1 illustrates an example computing infrastructure 100 used to host a content analytics service for multiple tenants, according to one embodiment of the invention. As shown, the computing infrastructure 100 includes a cloud based service provider 102 hosting a server system 105 and also includes computing client systems 130$_{1-2}$, all of which are connected to a communications network 120.

Illustratively, client computing system 130$_1$ is executing an analytics client 140 and client system 130$_2$ is executing a web browser 135. The analytics client 140 and the web browser 135 communicate with a content analytics tool 110 on the server system 105 over the network 120. For example, the analytics client 140 and the web browser 135 may be used to upload enterprise data associated with a given tenant as well as access the resulting data collections 115 hosted by the service provider 102. Client systems 130 are included to be representative of a variety of desktop or laptop computer systems. However, embodiments of the invention may be adapted for use with other computing devices. For example, web-browser applications are available for mobile telephone devices, tablet computers, game consoles, net books, etc.

In context of this disclosure, each data collection 115 provides a container that hosts documents and/or data records supplied by a given tenant along with the analyzed results or entities obtained from the analytical processing performed by the content analysis tool 110. For example, the content analytics tool 110 may be configured to mine text, apply natural language processors and custom annotators (e.g., a sentiment analysis) to quickly identify and represent issues on a dashboard rendered on the analytics client 140 (or web browser 135). The content analytics tool 110 could generate periodic reports on the analyzed data to monitor progress on identified issues—or dynamically generate insights as new data is provided to the content analytics tool 140, either as a new data collection 115 or additional data supplied to an existing data collection 115. In one embodiment, the content analytics tool 110 may assign a distinct collection ID to each data set supplied by a given tenant along with the index or analytics results (e.g., the results of natural language processing and sentiment analytics).

The content analytics tool 110 may provide a federation capability where multiple collections can be analyzed on one request. In such a case, an application ID is used to map a given tenant to one (or more) collection IDs. Further, a application ID may be required to coexist with each request for analysis submitted by a user. The application ID maps the request to one or many analyzable indexes (collections). Doing so allows a customer to have access to one or many analyzable indexes for their missions.

In one embodiment, the cloud service provider 102 licenses the content analytics tool 110 based on the number of systems or CPUs (virtual or physical) used for deployment. Such a license may need to be renewed or upgraded whenever additional CPUs are added to host more tenants on an expandable server infrastructure. Note, in this context, an expandable server 105 refers to the fact that the provider 102 can add additional RAM, CPUs and hard disk (whether such resources or physical or virtual resources) to accommodate more documents from one tenant or simply accommodate new tenants. For example, the provider 102 may install the analytics tool 110 on a virtual machine instance. Doing so allows the provider to rapidly increase processing capacity for a given customer (or new customers) by spawning additional virtual machine instances as needed.

Once licensed, the service provider 102 installs the product on their expandable server 105 and exposes the content analytics tool 110 as a cloud based service. In one embodiment, the service provider 102 provides a portal where tenants can login and upload their data collections in a secure way. For example, a customer may encrypt a zip file uploaded to the provider's portal via SFTP/SCP. In such a case, the customer would securely share keys to decrypt the package. Of course, a variety of protocols for the secure exchange of data and keys may be used.

Once received, the service provider 102 assigns a distinct application ID to the tenant (if a new tenant) or associates the data with an existing application ID (for data updates from an existing tenant). The provider 102 also creates a data collection 115 with the data uploaded by a customer. In one embodiment, the data collection 115 may be created from existing templates based on the vertical market of a given customer. That is, the analytical processing performed by the content analytics tool 110 to create a data collection 115 may be tailored based on the analytical needs of a given tenant. For example if the data represented call logs collected at a telecommunications service provider, in addition to default natural language processing, then the data collection 115 could also employ sentiment annotators to help identify customer sentiments relevant to users of mobile devices (e.g., mobile phones, smart phones, computing tablets, etc). Once any meaningful insights are detected (for example, a high volume of customer calls that mention the lack of cell phone signal at a given airport), the logged in employee could use an export capabilities of the text mining tool to extract the insights and share them out as reports. These exported reports could be discussed with executives for proper action.

Likewise if the data represented doctor dictations, then the data collection 115 could employ medical annotators that identify diseases, drugs, allergies, symptoms, etc. The dedicated annotators help extract entities and aid with faster discovery of insights. Of course, custom analysis templates and processing may be performed in addition to the use of existing templates. As noted, each such collection may be represented by a distinct collection ID and the service provider 102 associates the application ID associated with a given tenant's enterprise data to the collection ID.

In one embodiment, the service provider 102 maintains a registry of application IDs, tenants and collection IDs. Further, once the content analytics tool 110 creates a given data collection 115, the tenant's employees can log into a text mining portal using the web browser 135 or analysis client 140. Such a text mining application may provide a rich variety of visualization and facetted navigation capabilities to help the employee identify abnormalities or insights into the data. In order to access a given data collection, the mining application prompts for the tenant ID, password and the application ID. Once the login credentials are successfully verified, the content analytics tool 110 queries the registry to identify the dedicated Collection ID or IDs associated with a given application ID. From this point, the tenant's employee may access their data collections 115. Further, in one embodiment, the tenant's data may be presented as facets, and the user may be granted access to the data based on what facets they are authorized to view.

Figure 2:
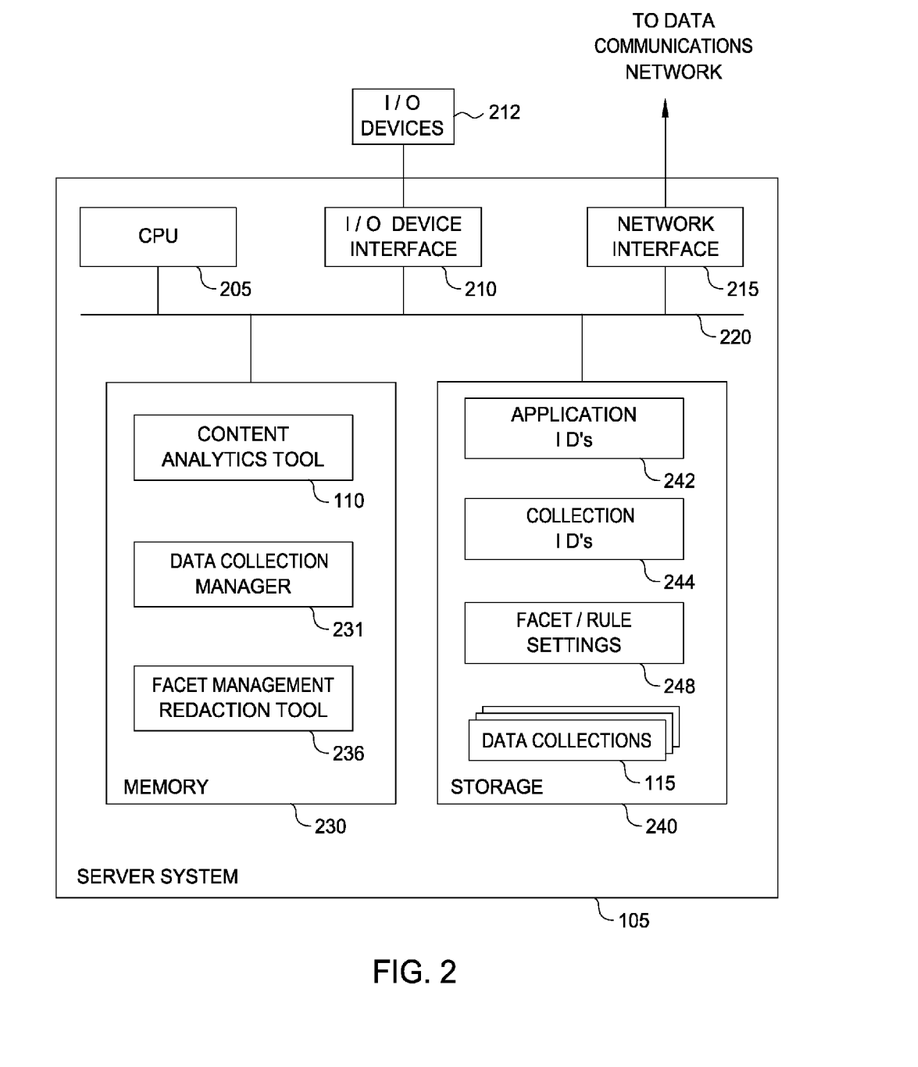
FIG. 2 illustrates an example of a server hosting a multi-tenant content analytics tool, according to one embodiment of the invention.

FIG. 2 illustrates an example of an expandable server 105 hosting a multi-tenant content analytics tool, according to one embodiment of the invention. As shown, the server 105 includes, without limitation, a central processing unit (CPU) 205, a network interface 215, an interconnect 220, a memory 230 and storage 240. The server 105 may also include an I/O device interface 210 connecting I/O devices 212 (e.g., keyboard, display and mouse devices) to the server 105.

The CPU 205 retrieves and executes programming instructions stored in the memory 230. Similarly, the CPU 205 stores and retrieves application data residing in the memory 230. The interconnect 220 facilitates transmission, such as of programming instructions and application data, between the CPU 205, I/O devices interface 210, storage 230, network interface 215, and memory 230. CPU 205 is included to be representative of a single CPU, multiple CPUs, a single CPU having multiple processing cores, and the like. And the memory 230 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards or optical storage, network attached storage (NAS), or a storage area-network (SAN). Further, sever system 105 is included to be representative of a physical server computing system as well as virtual machine instances hosted on a set of underlying physical computing systems. Further, although shown as a single computing system, one of ordinary skill in the art will recognized that the components of the server system 150 shown in FIG. 2 may be distributed across multiple computing systems connected by a data communications network.

As shown, the memory 230 includes the content analytics tool 110, a data collection manger 234 and a facet management/redaction tool 236; and the storage 240 includes application IDs 242, collection IDs 244, facet/rule settings 248 and data collections 110. As noted above, the content analytics tool 110 provides a software application configured to respond evaluate a collection of unstructured (and/or structured) data to derive analytical or semantic insights into the content of that data. For example, the natural language processing and domain-specific ontologies may be used to annotate documents with a variety of metadata to describe their content. The resulting annotated documents (and other metadata) are stored in a data collection 115 associated with a distinct collection ID. Further, indexes may be generated forms the unstructured data to describe different aspects of the document collections contents, also stored in the resulting data collection 115. Similarly, a data collection 115 may correspond to a dynamically growing data streams analyzed to identify trends or changes over time (e.g., changes in product sentiment or changes in product or service quality identified by the content analytics tool 110 in evaluating the data stream).

In one embodiment, the data collection manager 234 provides a software application configured to manage data collections 115 for multiple tenants. For example, the data collection manager 234 may include a registry used to map an application ID 242 (associated with a specific tenant) to one or more collection IDs 244 (corresponding to data records supplied by that tenant and analytics information generated by the analytics tool 110). Requiring users to supply an application ID 242 (along with other login credential) ensures that users associated with a given tenant are limited to accessing only the data collections 115 associated with that tenant.

Additionally, data collections 115 associated with a given tenant may be structured into a collection of facets. In such a case, each facet may include a particular set of documents, terms, values, metadata tags, etc., used to identify a given record or document (or portion thereof) as belonging to a given facet. For example, a data collection 110 created by the content analytics tool 110 in evaluating records from a teaching hospital could include facets for administration, medical, research, and billing/accounting. In such a case, unstructured data records (and portions of records) supplied by the enterprise could be tagged as being associated with one or more of these facets. Further, the results of annotating the documents in such a collection using custom, domain specific annotators, natural language processors, could also be tagged as belonging to one (or more) such facets. Doing so allows the facet management/redaction tool 236 to limit access to the data collections 115 (in terms of both the actual data records and analytical results generated by the content analysis tool). For example, a researcher (assigned a research role) could be allowed to navigate medical records annotated using the domain ontology to identify records that pertain to particular disease or symptom being researched. At the same time, the facet management/redaction tool 236 could redact out personally identifying information (e.g., patient names, addresses, ID numbers, etc.). Such information would typically be unnecessary for the researcher to benefit from the analytical insights derived by the content analytics tool.

In one embodiment, the facets created for a given data collection (or collections) 115 may be specified the corresponding tenant. For example, each tenant may designate one or more "super users." Such a user may view all the facets established for a given data collection 115 as well as configure the facets and roles for viewing. Once new roles are added to a facet or if any roles are deleted from the facet, other users should immediately see the effects of the configuration.

Figure 3:
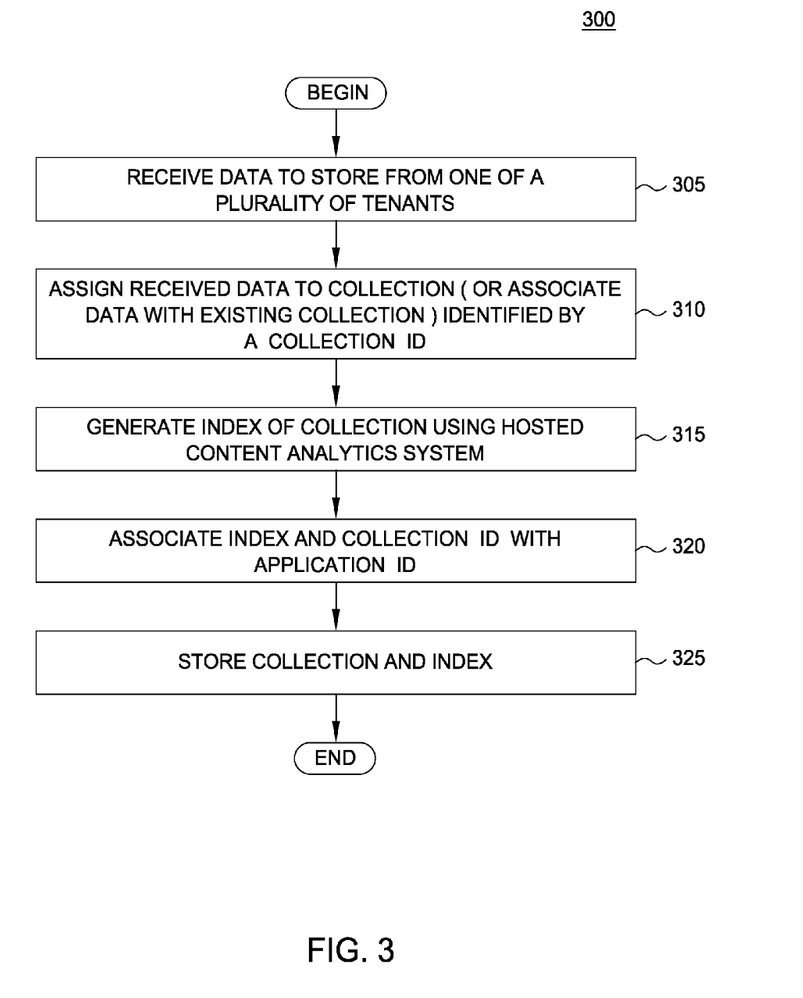
FIG. 3 illustrates a method for receiving a data collection from a tenant, where the data collection is analyzed using a content analytics tool, according to one embodiment of the invention.

FIG. 3 illustrates a method 300 for receiving a data collection from a tenant, where the data collection is analyzed using a content analytics tool, according to one embodiment of the invention. As shown, the method 300 begins at step 305, where a tenant-user uploads a data records to the cloud service provider. The data records may include structured and unstructured data in the form of text, audio, graphical images, database records, etc. In one embodiment, the cloud service provider may expose a portal accessed using a web-browser or specialized client application to securely upload data to the cloud provider. As noted, each tenant may be associated with an application ID (used to distinguish one tenant from another).

Once received, at step 310, the service provider hosting the content analytics service may assign a collection ID to the data records received at step 305. Alternatively, the records may be used to augment an existing data collection. At step 315, the content analytics tool may evaluate the received data in order to create a data collection, i.e., a combination of data records and results of analytical processing. As noted, while the analytical processes may be adapted to suit the analytical needs of a given tenant, such processing may include natural language processors, custom annotators, mapping text to domain ontologies, text mining, trend analysis, and a variety of other analytical processing functions.

At step 320, the service provider associates the collection ID for the data collection (data records and analysis results/indexes) with an application ID of the submitting tenant. And at step 325, the data analysis service stores the data collection, indexes, analysis results, as well as updates a registry with any new collection IDs, application IDs, and the appropriate mappings between them.

Figure 4:
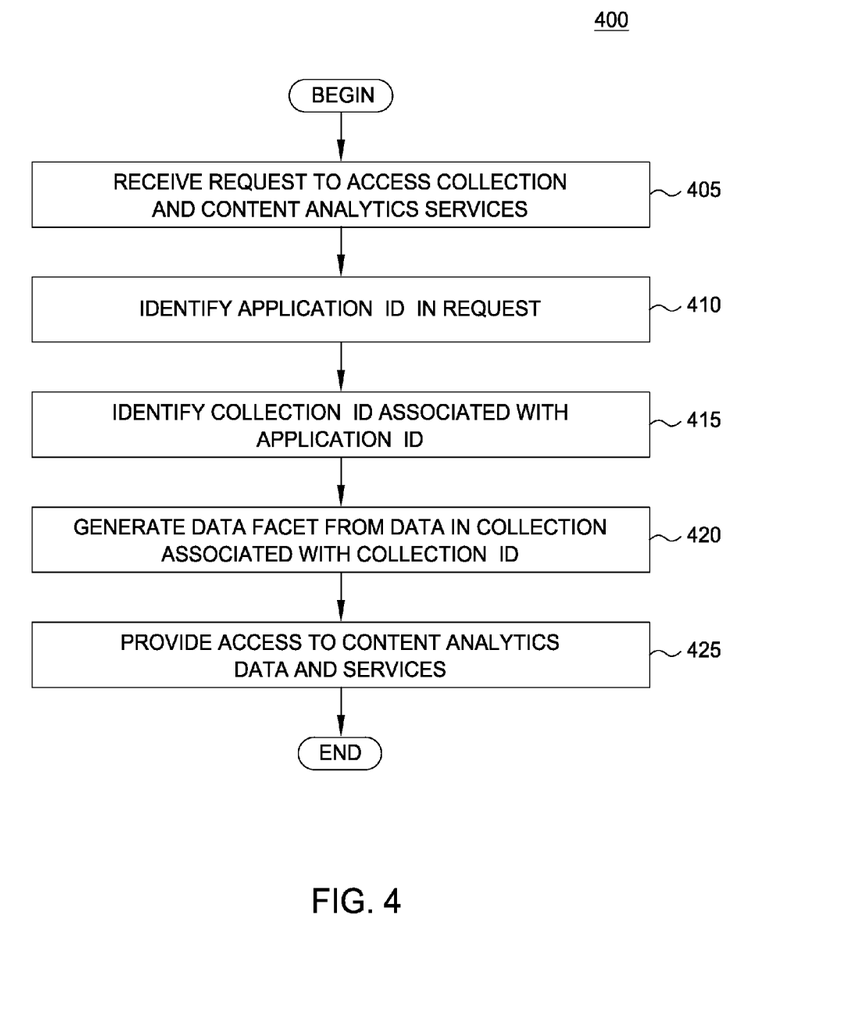
FIG. 4 illustrates a method for providing content analytics services to a requesting client using a content analytics system configured to support multiple tenants, according to one embodiment of the invention.

FIG. 4 illustrates a method 400 for providing content analytics services to a requesting client using a content analytics system configured to support multiple tenants, according to one embodiment of the invention. As shown, the method 400 begins at step 405 where the service provider receives a request for access to a data collection and content analytics services. The request may include a username/password or other credentials used to identify a user. The request may also include an application ID used to distinguish one tenant from another in accessing the content analytics services. After validating the user's credentials, the analytics service may identify the application ID included in the request (step 410).

At step 415, the analytics service can determine what data collections are associated with the application ID (and thus, are associated with a particular tenant). In one embodiment, the analytics service includes a registry which maps application IDs to collection IDs. Further, data collections associated with a given tenant may be faceted. That is, elements of the data collection navigable by a user may be tied to a user name or role associated with that user or role. This approach allows a large enterprise data collection to be evaluated/analyzed by the analytics service as single data collection, possibly improving the quality of the data analysis results. Further, this approach avoids the redundant processing that results from creating data analysis indexes for each facet individually. Instead, the user may navigate through a data collection and access only the facets they are authorized to view. Further, when the data analysis results annotates, mines, or evaluates free text or unstructured data, some data values may be redacted when presented to a user in the context of a particular user role. That is, while the user may navigate to certain documents in the data collection and/or the analytical results associated with a set of documents, certain values may be tagged to indicate they are associated with a particular facet for which the user is not authorized to view. Using a medical billing record as an example, a treating physical could view the treatments listed in the record along with a patient name, but a billing history and financial information could be redacted. Similarly, in a research role, another doctor might be able to view the treatment history presented in the billing record, but information about the patient (including the patient's name) could be redacted.

After generating a facet of a data collection (step 420), the content analytics service provides access to the navigable data facet (step 425). For example, a data facet may be rendered as a web page with links to the data records associated with the facet as well as the results of analytical processing. Thereafter, the user may browse data records in the facet as well review as the analytical insights uncovered by the content analytics tools (e.g., the custom annotations made by a domain ontology tool, or the measurements of consumer sentiment derived by text mining tools, etc). Further, in one embodiment, the analytical processing could be dynamic. For example, a user could request to view trending terms in customer feedback forms (or posted to social media channels) or in service or support requests received from customers. In such a case, the analytics tool could help identify emerging issues faced by a given enterprise as data records are added to an existing data collection. Similarly, text mining tools could be used to identify trends in sentiment related to a given product or service. Again, the particular data analytics performed for a client accessing the cloud based analytics service may be tailored based on the analytical needs or vertical market segment of a given tenant.

In one embodiment, a tenant may provide access to an enterprise user and role repository. For example, a tenant may grant the analytics service provider access to LDAP servers managed by the tenant (or other directory access or authentication services). In such a case, the analytics service provider may be given credentials (e.g., a username/password) to access an enterprise LDAP server. During the configuration of a data collection, a role (or roles) is assigned to each facet. The resulting role/facet associations are stored by the content analytics service provider. For example, in one embodiment, a table is created with facet names and a comma separated list of roles. The approach avoids the need to reindex a data collection whenever a role or facet is reconfigured after a data collection is created.

A data collection is made available after indexing and analyzing a dataset provided by the tenant. Users from a tenant login using secure portal (e.g., a browser using the HTTPS protocol) to discover insights from the data collection uncovered by the analytics service. As part of the login process, the analytics service identifies roles associated with a given user (which may then be cached on the client application). In one embodiment, the roles associated with a user are determined by running queries against the tenant's LDAP server. Once logged in the user may view the analyzed data collections. For example, the user may execute queries to view relationships between documents/records identified by the analytics tools.

Further, since the user's role was determined during the login process, the analytics service may access the cached list of roles to determine what facets a user may access. For example, the analytics server may issue queries against the roles and facets table to identify the list of authorized facets. Once determined, the analytics server filters out the unauthorized facets from query results and also redacts unauthorized facet values from the text of resulting documents/records. To optimize performance, the list of authorized facets can be cached to the user's session by the analytics service.

Figure 5:
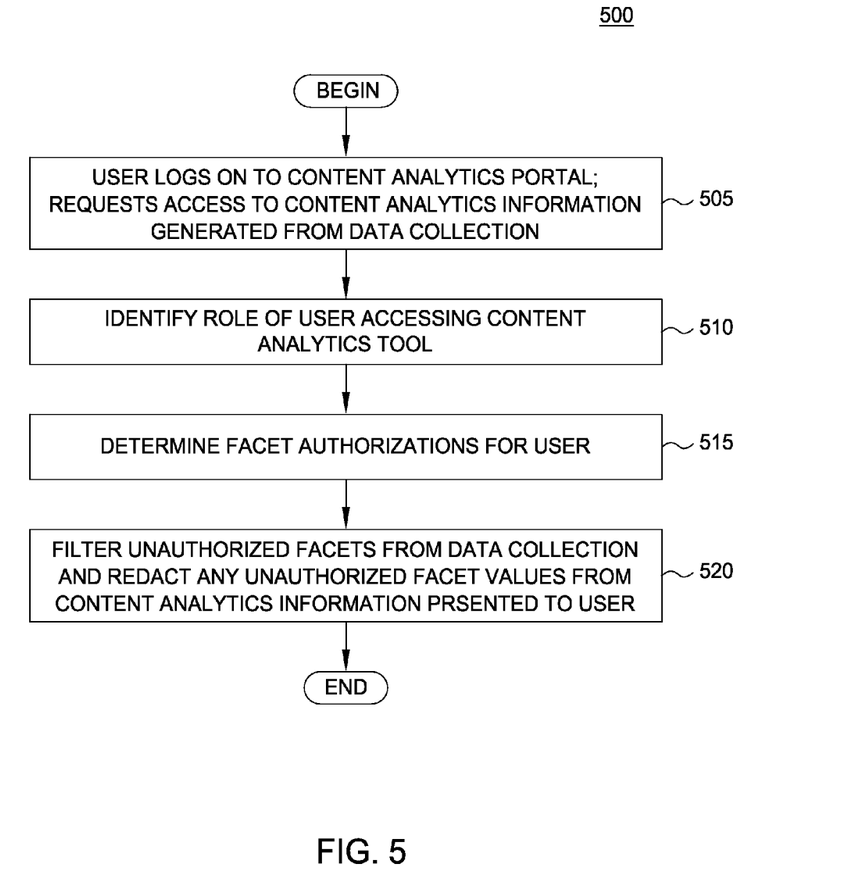
FIG. 5 illustrates a method for redacting content analytics information in reports based on a role-based facet associated with a user, according to one embodiment of the invention.

For example, FIG. 5 illustrates a method 500 for redacting content analytics information in reports based on a role-based facet associated with a user, according to one embodiment of the invention. As shown, the method 500 begins at step 505, where a user logs on to a content analytics portal and requests access to content analytics information generated from the data collections associated with a given tenant.

At step 510, the analytics service may identify a role (or roles) of a user accessing the content analytics tool. As noted, when the user logs on, the analytics service may identify a group of roles associated with the user, e.g., by querying a tenant's LDAP server with credentials of the service provider (to prove access is authorized) along with the credentials of the user (to determine what roles have been associated with that user).

At step 515, the analytics tool determines the facet authorizations for a user having the roles identified at step 510. As noted, the facet authorization may have been specified by a super user when configuring a given data collection stored on a provider cloud. Once a user's roles are identified, the user may query the analytics tool to search for documents and or analytics data created by the analytics tool using the tenant's enterprise data. The user may also request analytics services to perform against a given data facet (to which they have access) or against the results of a given document query. For example, a user could request all of the support tickets received from customers over a given time period (or at a given location). Once identified, the user could invoke a text mining tool in order to identify emerging terms or topics present in such tickets. As results are generated, at step 520, the analytics tool may filter unauthorized facets from a data collection (prior to executing query or prior to granting access to the data collection). Similarly, the analytics tool may redact any unauthorized facet data from content analytics information or documents in query results presented to a user.

Figure 6:
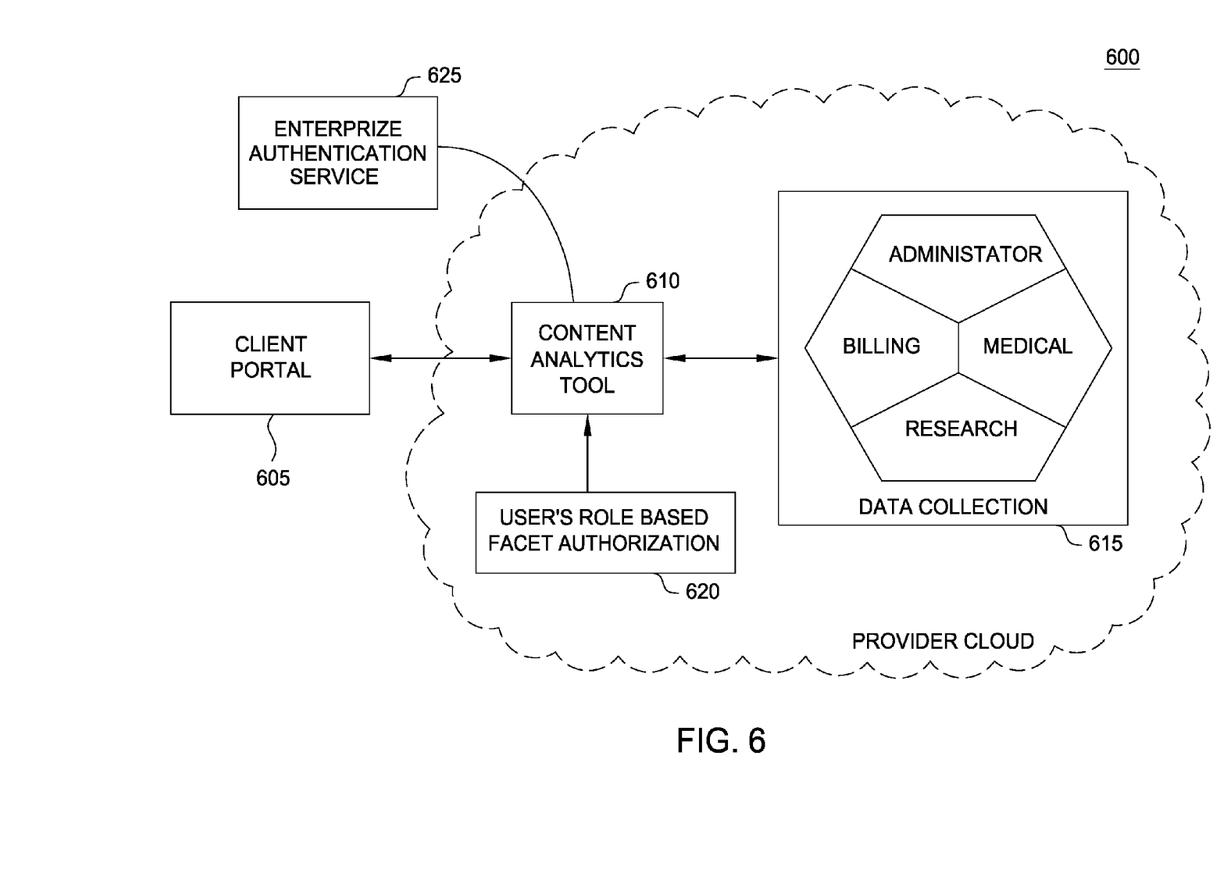
FIG. 6 illustrates an example of a user accessing a faceted data collection analyzed using a content analytics tool, according to one embodiment of the invention.

FIG. 6 illustrates an example of a user accessing faceted data collection analyzed using a content analytics tool, according to one embodiment of the invention. As shown, a user controls a client portal 605 to interact with a content analytics tool 610 in order to access facets of a data collection 615. Before granting access, the analytics tool 610 may query an enterprise authentication service 625 associated with the tenant (e.g., an LDAP service) to determine a set of roles associated with a given user. After determining the users' role based facet authorizations 620, the content analytics tool may filter a data collection made available to the user interacting with client portal 605. That is, the user is presented the facets of data collection they are authorized to access. For example, as shown, data collection 615 includes administration, billing, medial, and research facets. Depending on the facet authorizations 620 associated with a user, the content analysis tool 610 filters data from the data collection 615 sent to the client portal 605.

Figure 7:
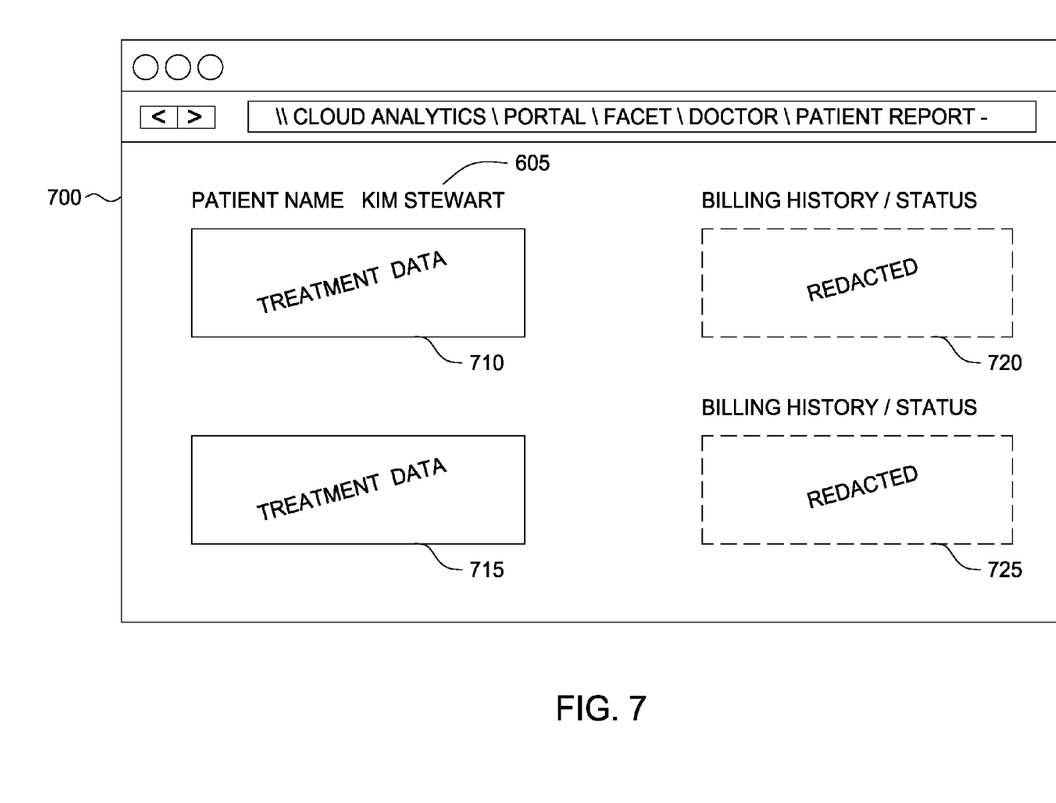
FIG. 7 illustrates an example user interface showing content analytics information redacted based on a user's role based facet authorizations, according to one embodiment of the invention.

FIG. 7 illustrates an example user interface 700 showing content analytics information redacted based on a user's role based facet authorizations, according to one embodiment of the invention. For this example, assume a user interacting with the client portal 605 issues a query to identify records in the data collection that indicate they received treatment for a particular medical condition or exhibited some particular symptom. And further, that the query is issued by a user that has been granted access to the "medical" facet but not the "billing" facet. In this example, the index generated by the content analytics tool may indicate that patient billing records are related to the medical condition. However, prior to presenting these records to the user, values in the record associated with a "billing facet" may be redacted. This result is shown in interface 700 where the billing history/status 720 725 is redacted from the document presented to the user, while treatment data 710 and 715 is not.

While portions of the document collection are filtered and/or redacted, the content analytics tool may analyze the complete set of data provided by a tenant—regardless of what facet given data elements belong. That is, although a user may not have direct access to elements of a data collection, indexes, analytics information, or access to certain facets and/or facet values, and although some analytics information presented to a user may be redacted in reports generated by the content analytics tool, the analytical processing performed by the content analytics tool still relies on the full set of enterprise data. Doing so enforces the role based access and facet navigation rules, while still allowing for the full value of the analytics processing to be obtained.

Advantageously, embodiments of the invention provide a multi-tenant architecture used to host and provide content analytics services. In one embodiment, the multi-tenant configuration hosts multiple customers on one installation of the content analytics tools (which may span multiple physical and/or virtual server systems). As a result, the service provider requires only a single installation (and license) of the software used to host and service analytical needs for many customers with similar needs. To provide separation per tenant, the content analytics tool may assign a distinct application ID to each individual customer or enterprise that a data to be evaluated using the analytics tools hosted by the platform. The content analytics tool may assign a distinct collection ID to each analyzed data set. A registry may be used to maintain a mapping from a given application ID (associated with a given tenant) and a corresponding set of data collections.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing a computer program product for providing concurrent secure multitenant access to a hosted content analytics application, which, when executed on a processor, performs an operation for providing secure multitenant access to a common instance of a content analytics application, the operation comprising:

generating, by operation of the processor, for each dataset received from one of a plurality of tenants, a data collection having a plurality of facets, wherein each data collection includes the received dataset and corresponding data analytics information generated by the common instance of the content analytics application, wherein each facet includes elements of the data collection tagged with metadata indicating which data element belongs to a given facet, wherein each facet is associated with one or more user roles, and wherein generating the analytics information includes performing natural language processing of unstructured data of each dataset to characterize content of the unstructured data;

associating a collection identifier (ID) with an application identifier (ID) assigned to the tenant from whom the respective dataset was received, wherein the collection ID and the application ID are stored in a data store that comprises mappings of application IDs to one or more collection IDs; and providing users of each tenant with role-based access to only the facets data in the data collection associated with that tenant, based on the associated user roles, wherein each tenant is provided with concurrent accesses to the common instance of the content analytics application and wherein the concurrent access to the common instance of the content analytics application is limited to each tenant having access to the data collection associated with that tenant based on the application ID and associated collection ID.

2. The non-transitory computer-readable medium of claim 1, wherein generating the analytics information includes performing text mining of the unstructured data.

3. The non-transitory computer-readable medium of claim 1, wherein generating, by operation of one or more computer processors, the analytics information corresponding to each received dataset includes generating a data collection having a plurality of facets.

4. The non-transitory computer-readable medium of claim 1, wherein providing a tenant with user access to the generated data collection corresponding to the assigned application ID and associated collection ID comprises:

identifying one or more roles associated with a user requesting access to the data collection, wherein the request includes the application ID assigned to that tenant and login credentials associated with the user;

identifying one or more facets, of the plurality, associated with the identified one or more roles;

filtering the generated data collection based on the identified one or more facets; and providing the user with access to the filtered data collection.

5. The non-transitory computer-readable medium of claim 4, wherein identifying one or more roles associated with a user requesting access to the data collection comprises querying, by the common instance of the content analytics application, an enterprise authentication service hosted by the tenant.

6. A system, comprising:

a processor; and a memory storing an application program configured to perform an operation performs an operation for providing concurrent secure multitenant access to a common instance of a content analytics application, the operation comprising:

generating, by operation of the processor, for each dataset received from one of a plurality of tenants, a data collection having a plurality of facets, wherein each data collection includes the received dataset and corresponding data analytics information generated by the common instance of the content analytics application, wherein each facet includes elements of the data collection tagged with metadata indicating which data element belongs to a given facet, wherein each facet is associated with one or more user roles, and wherein generating the analytics information includes performing natural language processing of unstructured data of each dataset to characterize content of the unstructured data, associating a collection identifier (ID) with an application identifier (ID) assigned to the tenant from whom the respective dataset was received, wherein the collection ID and the application ID are stored in a data store that comprises mappings of application IDs to one or more collection IDs, and providing users of each tenant with role-based access to only the facets in the data collection associated with that tenant, based on the associated user roles, wherein each tenant is provided with concurrent accesses to the common instance of the content analytics application and wherein the concurrent access to the common instance of the content analytics application is limited to each tenant having access to the data collection associated with that tenant based on the application ID and associated collection ID.

7. The system of claim 6, wherein generating the analytics information includes performing text mining of the unstructured data.

8. The system of claim 6, wherein providing a tenant with user access to the generated data collection corresponding to the assigned application ID and associated collection ID comprises:

identifying one or more roles associated with a user requesting access to the data collection, wherein the request includes the application ID assigned to that tenant and login credentials associated with the user;

identifying one or more facets, of the plurality, associated with the identified one or more roles;

filtering the generated data collection based on the identified one or more facets; and providing the user with access to the filtered data collection.

9. The system of claim 8, wherein identifying one or more roles associated with a user requesting access to the data collection comprises querying, by the tenant and login credentials associated with the user content analytics application, an enterprise authentication service hosted by the tenant.

10. The system of claim 6 wherein the operation further comprises:

receiving a request from a user of one of the tenants to access one or more facets in the data collection associated with that tenant, wherein the request includes the application ID assigned to that tenant and login credentials associated with the user;

identifying, via the data store, the associated collection ID based on the application ID in the request; and redacting content in the one or more facets returned in response to the request that is not associated with the user roles of the requesting user.

* * * * *